US012722210B2

(12) United States Patent
Chera et al.

(10) Patent No.: US 12,722,210 B2
(45) Date of Patent: Sep. 1, 2026

(54) TOOL INSERT IN A CYLINDER BORING MACHINE FOR MACHINING A CYLINDER BORE

(71) Applicant: Van Norman Machine India PVT LTD, Chandigarh (IN)

(72) Inventors: Ranjit (Robin) Chera, Chandigarh (IN); Sandeep Chera, Chandigarh (IN)

(73) Assignee: Van Norman Machine India PVT LTD, Chandigarh (IN)

( * ) Notice: Subject to any disclaimer, the term of this patent is extended or adjusted under 35 U.S.C. 154(b) by 314 days.

(21) Appl. No.: 18/617,703

(22) Filed: Mar. 27, 2024

(65) Prior Publication Data

US 2025/0242418 A1 Jul. 31, 2025

(51) Int. Cl.
*B23B 41/12* (2006.01)

(52) U.S. Cl.
CPC .......... *B23B 41/12* (2013.01); *B23B 2270/30* (2013.01)

(58) Field of Classification Search
CPC ............................ B23B 41/12; B23B 2270/30
See application file for complete search history.

(56) References Cited

U.S. PATENT DOCUMENTS 3,333,487 A * 8/1967 Parry ........................ B23C 3/05 408/97
3,782,847 A * 1/1974 Kulzer ...................... F02F 1/38 408/709
4,127,942 A * 12/1978 Flaten ...................... G01B 5/24 408/709
4,414,723 A * 11/1983 Kammeraad .......... B23Q 3/005 408/709
4,792,265 A * 12/1988 Rottler .................... B23B 41/12 408/709
4,954,024 A * 9/1990 Kress ...................... B23B 51/00 408/179
5,211,516 A * 5/1993 Kress ................. B23B 27/1625 407/41
5,421,681 A * 6/1995 Stephens ............... B23B 29/046 408/180

(Continued)

FOREIGN PATENT DOCUMENTS

CA 1293160 C * 12/1991

*Primary Examiner* — Bayan Salone
(74) *Attorney, Agent, or Firm* — Riyon Harding

(57) ABSTRACT

A cylinder boring machine for machining a cylinder bore is disclosed. The cylinder boring machine includes a housing having cylinder block fixtures for receiving a cylinder block. The cylinder block includes the cylinder bore. The cylinder boring machine includes a working head positioned above the housing. The working head includes a tool holder. The tool holder receives a first boring tool insert and a second boring tool insert for operating in rough and fine boring cycles. The cylinder boring machine includes an operational panel and a controller communicatively connected to the operational panel. The controller operates the tool holder connecting the first boring tool insert followed by the second boring tool insert in the rough and fine boring cycles to axially move and rotate in opposite directions for removing the material from the surface of the cylinder bore, and eliminating torn and folded materials (TFM) left in the cylinder bore with the second boring tool insert.

9 Claims, 13 Drawing Sheets

(56) References Cited

U.S. PATENT DOCUMENTS

| | | | | |
|---|---|---|---|---|
| 5,427,480 | A * | 6/1995 | Stephens | B23B 29/03457 408/180 |
| 5,725,335 | A * | 3/1998 | Harmand | B23C 3/055 451/430 |
| 5,836,725 | A * | 11/1998 | Harmand | B23B 29/02 408/54 |
| 6,086,293 | A * | 7/2000 | Harmand | F01B 1/12 408/82 |
| 6,254,319 | B1 * | 7/2001 | Maier | B23C 5/2472 407/45 |
| 6,382,883 | B1 * | 5/2002 | Harmand | F02F 1/24 408/82 |
| 8,545,138 | B2 * | 10/2013 | Wilkins | B23Q 17/2266 408/54 |
| 11,103,931 | B2 * | 8/2021 | Karlsson | B23B 29/03439 |
| 2010/0310328 | A1 * | 12/2010 | Wilkins | B23Q 17/2266 408/54 |
| 2012/0121348 | A1 * | 5/2012 | Eckert | B23B 41/12 408/1 R |
| 2017/0043407 | A1 * | 2/2017 | Ogata | B23B 29/0341 |
| 2017/0070035 | A1 * | 3/2017 | Crowell | H02B 3/00 |
| 2017/0165764 | A1 * | 6/2017 | Cheronneau | B23B 29/0341 |

* cited by examiner

TOOL INSERT IN A CYLINDER BORING MACHINE FOR MACHINING A CYLINDER BORE

CROSS-REFERENCE TO RELATED APPLICATION

This application is based upon and claims priority from, Application No. 202411006584, filed on 31 Jan. 2024 the entireties of both of which are incorporated herein by reference for all purposes.

TECHNICAL FIELD

The present disclosure relates to cutting tools, and in particular, relates to a cylinder boring machine having a tool insert for machining a cylinder bore in a cylinder block of an internal combustion (IC) engine.

DESCRIPTION OF THE RELATED ART

Cylinder bore indicates a cylinder opening or chamber formed in an internal combustion (IC) engine. The cylinder bore houses a piston and facilitates the combustion process in the IC engine. The cylinder bore is machined using a tool insert or "boring insert" connected to a tool holder. The tool insert indicates a replaceable cutting element that is mounted on a boring tool. The tool insert is made of carbide, ceramic, and cubic boron nitride (CBN) depending on the need. The type of material used depends on the hardness of the material to be machined, the surface finish required, and the cutting conditions. An example of the tool insert includes a diamond insert or cutter that is widely used in the art. The tool insert is used to enlarge and true the cylinder bore with required surface finish.

As known, the tool insert has a specific geometry to perform specific machining operations. The tool insert includes cutting edges to enlarge and true the cylinder bore, with considerations for the required tolerances. Typically, the geometry of the tool insert affects the chip-breaking capability, chip evacuation from the cylinder bore, the tool life, and overall machining performance.

Several companies such as Sunnen™, Rottler™ among others offer boring tools or tool inserts for achieving bore depths of deeper than 7+ times dia. (L/D). The tool inserts typically include a boring tool and a honing tool. The boring tool is used to enlarge the cylinder bore. Further, the honing tool is used to hone the surface of the cylinder bore to achieve required surface finish. Some of the existing tool inserts are configured to produce the cylinder bores with closer tolerances and finer surface finishes.

Although the existing tool inserts are preferred for boring and honing operations due to their hardness and wear resistance, they present several problems. For example, the boring tools wear over time affecting the cutting performance. Further, inappropriate cutting parameters such as inappropriate cutting speeds, feeds, or depths of cut may lead to inefficient material removal and cause tearing or folding of the cast iron material. Further, misalignment of the tool holder or poor rigidity of the tool holder might cause vibrations or chatter, which results in uneven tool engagement leading to torn and folded material (TFM) in the cylinder bore. TFM is generally defined as microscopically smeared, metallic debris attached to a machined surface, particularly on honed cylinder bore surfaces. In other words, TFM is a type of surface defect created during a machining (honing) process. The TFM size, quantity and distribution changes the topography of a honed surface, affecting the value of the surface parameters. The TFM greatly affects the performance of the IC engine.

Generally, the TFM is assessed by appropriate surface parameters obtained from surface profile measurements to quantify the amount of the TFM on the honed cylinder bore surfaces. Surface Index (SI) is a function of the surface parameters such as average roughness, $R_a$; bearing ratio parameters, (reduced peak height) $R_{pk}$, (reduced valley depth) $R_{vk}$, and (core roughness depth) $R_k$; mean peak spacing or mean spacing of profile elements, $S_m$; skewness, $R_{sk}$; and the average maximum profile height, $R_z$. The higher the amount of TFM, the higher is the value of SI. For example, the presence of the TFM leads to a rougher surface, resulting in higher value of $R_a$.

Therefore, there is a need in the art to provide a tool insert that eliminates any torn and folded material (TFM) left in a cylinder bore after rough and fine boring cycles and provides finer surface finish with acceptable surface parameters in the cylinder bore.

SUMMARY

It is an object of the present invention to provide a cylinder boring machine for machining a cylinder bore and that avoids the drawback of known cylinder boring machines or tool inserts.

It is another object of the present invention to provide a cylinder boring machine having tool inserts that eliminate any torn and folded material (TFM) left in a cylinder bore after rough and fine boring cycles and provides finer surface finish with acceptable surface parameters in the cylinder bore very close surface parameters to the surface finish achieved by rough and final honing finishing thereby reducing the honing cycle.

It is another object of the present invention to provide a cylinder boring machine having tool inserts to produce the cylinder bores with closer tolerances and finer surface finishes eliminating the need for honing.

In order to achieve one or more objects, the present invention provides a cylinder boring machine for machining a cylinder bore. The cylinder boring machine includes a housing having cylinder block fixtures for receiving a cylinder block. The cylinder block includes the cylinder bore. The cylinder boring machine includes a working head positioned above the housing. The working head includes a tool holder. The tool holder receives a boring tool insert. In one example, the boring tool insert includes a first boring tool insert and a second boring tool insert.

In one implementation, the first boring tool insert positions in the tool holder and helps to remove the material (rough boring cycle) from the surface of the cylinder bore. Subsequently, the second boring tool insert positions in the tool holder and helps to achieve a finer finish (fine boring cycle) on the surface of the cylinder bore. Each of the first boring tool insert and the second boring tool insert includes an insert clamp at one end and a cutting edge at the other end. The cutting edge comes in contact with the surface of the cylinder bore to remove the material from the surface of the cylinder bore. Further, the cutting edge includes a chip groove to evacuate the material/chips/torn and folded material (TFM) removed during machining. In one example, the tool holder holding the first boring tool insert is configured to rotate in clockwise direction (first direction), and the tool holder holding the second boring tool insert is configured to rotate in anticlockwise direction (i.e., opposite direction of the first boring tool insert). In another example, tool holder holding the first boring tool insert is configured to rotate in anticlockwise direction (first direction), and the tool holder holding the second boring tool insert is configured to rotate in clockwise direction (i.e., opposite direction of the first boring tool insert).

Further, the cylinder boring machine includes an operational panel (display) and a controller communicatively connected to the operational panel. The controller operates the tool holder connecting the first boring tool insert in the rough boring cycle and the second boring tool insert in the fine boring cycle to axially move and rotate in opposite directions (first boring tool insert in anticlockwise and the second boring tool insert in clockwise direction, or vice versa) such that the first boring tool insert machines the surface of the cylinder bore by removing the material from the surface of the cylinder bore. The second boring tool insert eliminates torn and folded materials (TFM) left in the cylinder bore after the boring cycle.

In one advantageous feature of the present invention, the boring tool inserts (plato boring and fine boring inserts) help to achieve the finer surface finish while also eliminating any torn and folded material (TFM) left in the cylinder bore after finishing boring cycle with the second boring tool insert i.e., fine boring insert. This helps to take care of TFM in the reverse cycle of the boring process itself.

In another advantageous feature of the present invention, the boring tool inserts help to achieve the required surface finish in the cylinder bore with boring inserts itself. When compared with the prior art which requires honing process in addition to the boring process to achieve the standard values of surface parameters, the presently disclosed boring tool inserts help to achieve the standard values of surface parameters with boring process itself. This allows to achieve surface finish closer to honing surface finish in the prior art. In one example, the boring tool inserts help to achieve up to 80-85% of surface finish with the boring cycles itself when compared to honing surface finish achieved in the prior art. This results in reduction of time required to perform subsequent honing finish and amount of material to be removed with honing inserts.

In another advantageous feature of the present invention, the boring tool inserts after rough and fine boring cycles produce average roughness, $R_a$; bearing ratio parameters, (reduced peak height) $R_{pk}$, (reduced valley depth) $R_{vk}$, and (core roughness depth) $R_k$; mean peak spacing or mean spacing of profile elements, $S_m$; skewness, $R_{sk}$; and the average maximum profile height, $R_z$ parameters very close to finish honing cycle. Since the present invention avoids honing cycle/process, this allows to reduce final honing cycle time. As a result, the presently disclosed cylinder boring machine can make traditional vertical boring machines obsolete. When compared with known art, the present invention eliminates possible metal foldment caused by the diamond honing process.

In another advantageous feature of the present invention, the boring tool inserts help to eliminate any torn and folded material (TFM) left in a cylinder bore after rough and fine boring cycles and provides finer surface finish with acceptable surface parameters in the cylinder bore very close surface parameters to the surface finish achieved by rough and final honing finishing thereby reducing the honing cycle. In one example, the boring tool inserts help to achieve very close bore finish after boring, honing, cross hatch and plateau honing with surface parameters (reduced peak height) $R_{pk}$ of 10 to 15 microns, (reduced valley depth) $R_{vk}$ of 40 to 50 microns, and (core roughness depth) $R_k$ of 50 to 55 microns. After performing the rough and fine boring cycles, light honing strokes followed by cross hatch and plateau honing will provide needed results, the above specified surface parameters can be achieved.

The cylinder boring machine offers a more efficient and sustainable approach to machine a cylinder bore by achieving the surface parameters with boring cycles itself. This helps to prevent or minimize tool usage and to save electricity in a sustainable manner.

In another advantageous feature of the present invention, the boring tool inserts offer to perform platoboring at least motor load when compared to rough honing operation. For instance, diamond stones used in the prior art for performing rough honing take approximately 40 percent of motor load. This is because; the diamond honing pushes and folds torn material back in cast iron wall cavities and ruptures material under higher pressures needed for the diamond stones to remove material. In the present invention, the boring tool inserts removes much of the material i.e., up to 80-85% material closer to honing surface finish, as a result approximately 15-20% motor load required can be reduced when compared with the use of same motors for operating the diamond stones.

The presently disclosed boring tool inserts can be used for automotive and diesel engine rebuilds.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention so as to enable those skilled in the art to practice the invention. Notably, the FIGURES and examples are not meant to limit the scope of the present invention to a single embodiment, but other embodiments are possible by way of interchange of some or all of the described or illustrated elements and, further, wherein.

DETAILED DESCRIPTION

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed cylinder boring machine for machining a cylinder bore. However, it will be apparent to those skilled in the art that the presently disclosed invention may be practiced without these specific details. In some instances, well-known structures and devices are shown in functional or conceptual diagram form in order to avoid obscuring the concepts of the presently disclosed cylinder boring machine.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a cylinder boring machine for machining a cylinder bore, it is to be further understood that numerous changes may arise in the details of the embodiments of the cylinder boring machine. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Various features and embodiments of a cylinder boring machine for machining a cylinder bore are explained in conjunction with the description of FIGUREs (FIGS. 1-17.

Figure 1:
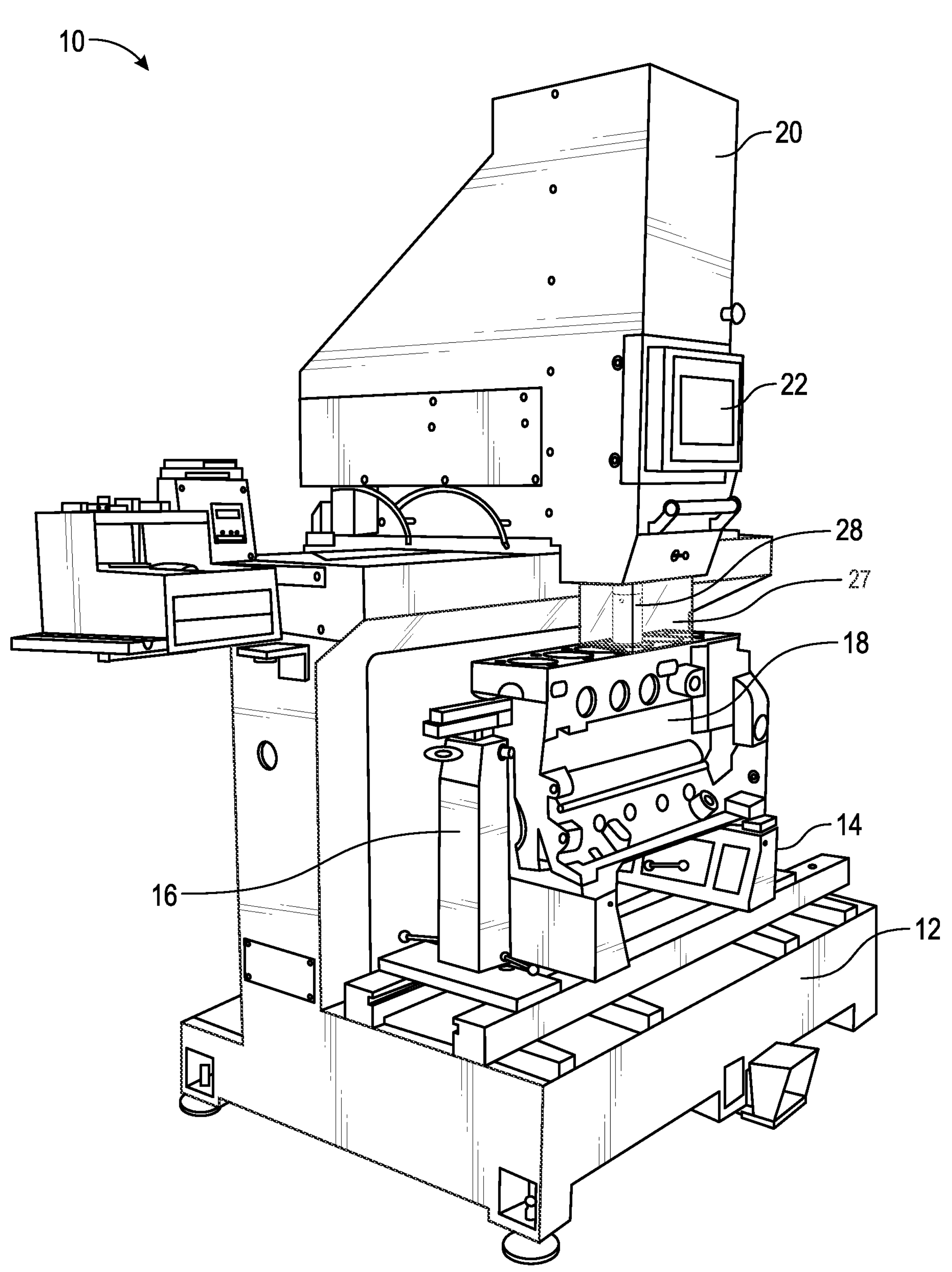
FIG. 1 illustrates a perspective view of a cylinder boring machine, in accordance with one embodiment of the present invention.
Figure 3:
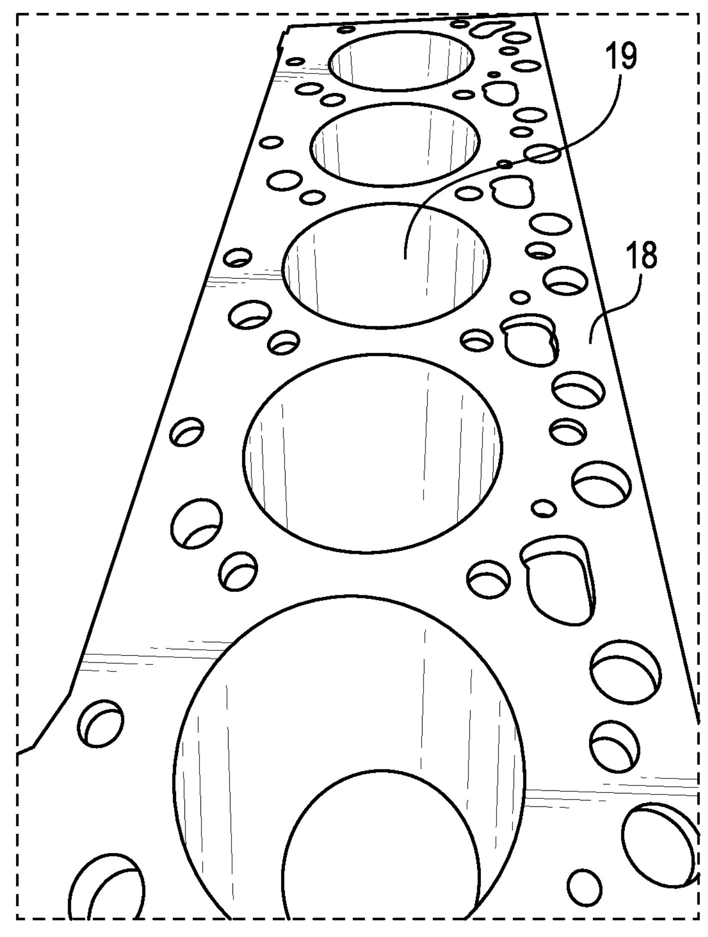
FIG. 3 illustrates a perspective view of a cylinder block having cylinder bores to be machined, in accordance with one embodiment of the present invention.

FIG. 1 shows a side perspective view of a cylinder boring machine 10 incorporating boring tool inserts or cylinder boring bits 30, 50 for machining a cylinder bore 19 of a cylinder block 18, in accordance with one embodiment of the present invention. Cylinder boring machine 10 includes a housing or cabinet 12 having a workbench 14. Workbench 14 is mounted on housing 12 by way of an air cushion platform which provides movement along the x, y plane. Workbench 14 includes cylinder block fixtures 16 for receiving cylinder block 18 to be machined. Here, cylinder block 18 positions between cylinder block fixtures 16. FIG. 3 shows a perspective view of cylinder block 18 having cylinder bores 19 to be machined using tool inserts 30, 50. Cylinder boring machine 10 includes a working head 20 at the top of housing 12. Working head 20 encompasses a display 22 for adjusting manual or automatic options for fine-tuning and making adjustments on the fly to operate cylinder boring machine 10.

Figure 2:
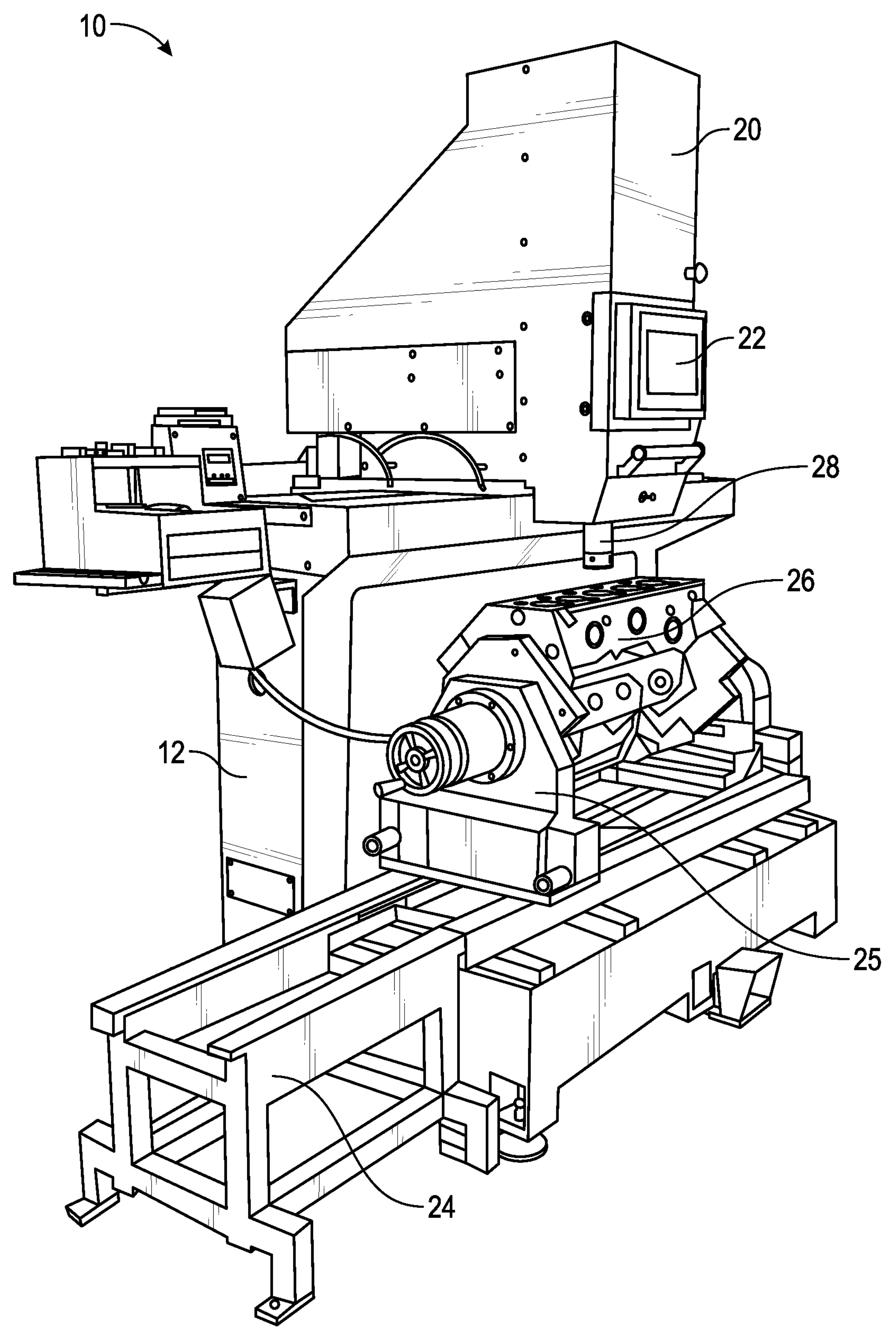
FIG. 2 illustrates a perspective view of the cylinder boring machine having an extended workbench, in accordance with another embodiment of the present invention.

FIG. 2 shows cylinder boring machine 10 having an extended workbench 24, in accordance with another embodiment of the present invention. Here, extended workbench 24 is used in place of workbench 14 presented above. As can be seen, extended workbench 24 positions on housing 12 and includes a slidable base allowing special fixtures 25 to be fixed over it. Fixtures 25 receive a second cylinder block 26. In one example, second cylinder block 26 includes a V-cylinder block having cylinder bores (not shown) to be machined.

Referring back to FIG. 1, working head 20 includes a tool holder or spindle 28. Tool holder 28 extends downward from working head 20. In one example, working head 20 a transparent shield 27 that selectively extends from working head 20 and covers tool holder 28 at the time of operation of cylinder boring machine 10. Tool holder 28 includes a tool receiving area 29. Tool receiving area 29 indicates a hole configured for receiving a boring tool insert 30, 50. For ease of reference, boring tool insert 30 is referred to as a first boring tool insert 30, and boring tool insert 50 is referred to as a second boring tool insert 50 hereinafter. Optionally, first boring tool insert 30 may also be referred to as a plato boring insert or rough boring insert. Further, second boring tool insert 50 may be referred to as a plato fine insert or fine boring insert. In one example, second boring tool insert 50 indicates a traditional tool insert that is designed to be operated in a clockwise direction to smoothen the surface of cylinder bore 19. Each of first boring tool insert 30 and second boring tool insert 50 is made of carbide, ceramic, or cubic boron nitride (CBN) depending on the need.

Figure 4A:
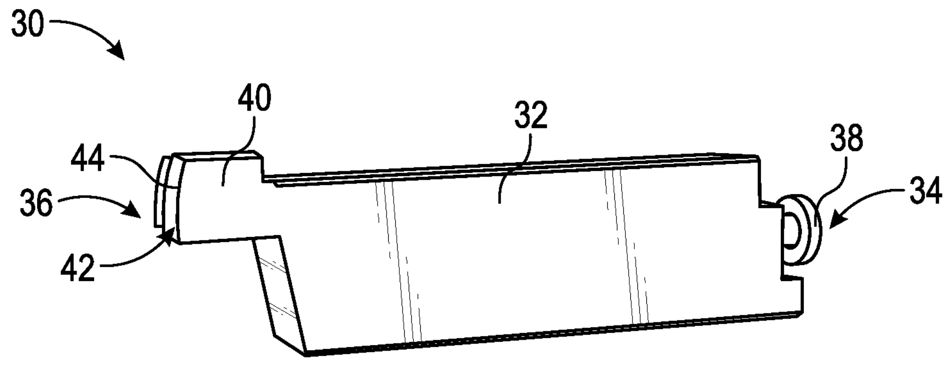
FIG. 4A and FIG. 4B illustrate a top perspective view and a side perspective view, respectively of a first boring tool insert i.e., plato boring tool, in accordance with one embodiment of the present invention.
Figure 4B:
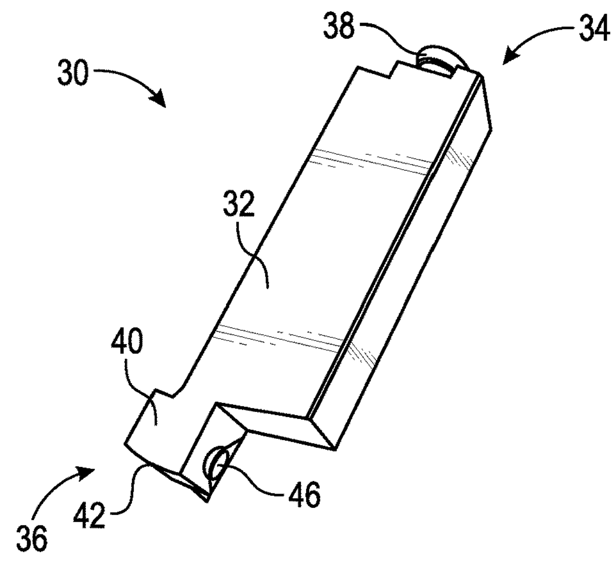

FIG. 4A and FIG. 4B show a top perspective view and a side perspective view, respectively of first boring tool insert 30, in accordance with one embodiment of the present invention. First boring tool insert 30 includes a first body or first insert body 32. First body 32 is made of hard and durable material such as carbide or any other suitable material. First body 32 comes in a substantially rectangular configuration. First body 32 provides structural support and stability during the machining process. First body 32 has a first end 34 and a second end 36. At first end 34, first body 32 has a first insert clamp or first clamp head 38. First insert clamp 38 extends from first body 32 and interacts with an insert connector (not shown) in tool holder 28, when inserted through tool receiving area 29. First insert clamp 38 is configured to hold first boring tool insert 30 in place and maintain its position within tool holder 28 during machining. First body 32 further includes a first extended section 40. First extended section 40 extends from first body 32 in a step-like configuration. First extended section 40 has a first cutting edge 42. First cutting edge 42 indicates a sharp and an active portion of first boring tool insert 30 that comes in contact with cylinder bore 19 during machining. In one embodiment, first cutting edge 42 is precisely machined to achieve a specific cutting geometry in cylinder bore 19.

Further, first cutting edge 42 has a first radius or first nose radius 44. First radius 44 has a round or curved configuration at the intersection of first cutting edge 42. In one example, the round or curved configuration at the intersection of first cutting edge 42 is configured to match the surface to be machined in order to improve machining of the bore surface. First radius 44 is configured to position (curved) in an anti-clockwise direction for operating tool holder 28 in an anti-clockwise direction to machine cylinder bore 19. First radius 44 has a suitable smooth curve (i.e., suitable size of nose radius) in order to reduce stress concentrations on cylinder bore 19 and also to improve the durability of first boring tool insert 30. First radius 44 facilitates in achieving the precise machining performance (rough boring) in cylinder bore 19 to be machined. In addition, first extended section 40 has a first chip groove or first flute 46 at the bottom. First chip groove 46 helps to guide and control the flow of chips/torn and folded materials (TFM) away from a cutting zone during machining. In other words, first chip groove 46 helps to evacuate the chips or metallic debris removed during machining so that they do not come in contact with the surface to be machined or machined surface.

Figure 6:
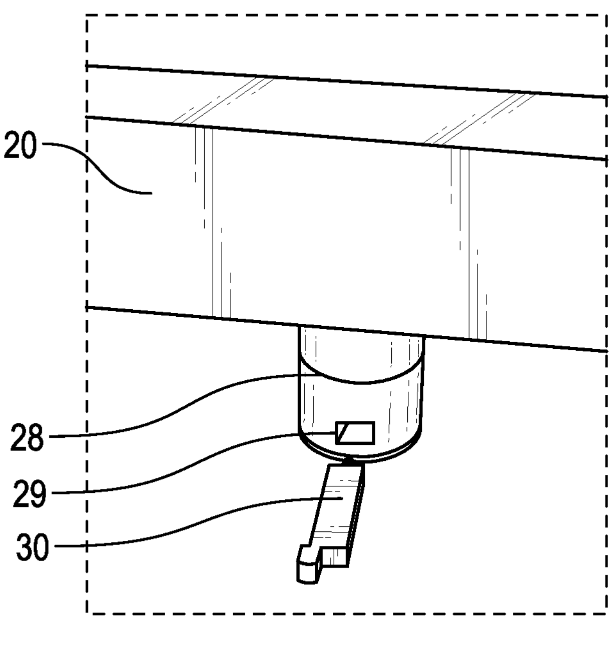
FIG. 6 illustrates the first boring tool insert aligned with a tool holder, in accordance with one embodiment of the present invention.
Figure 7:
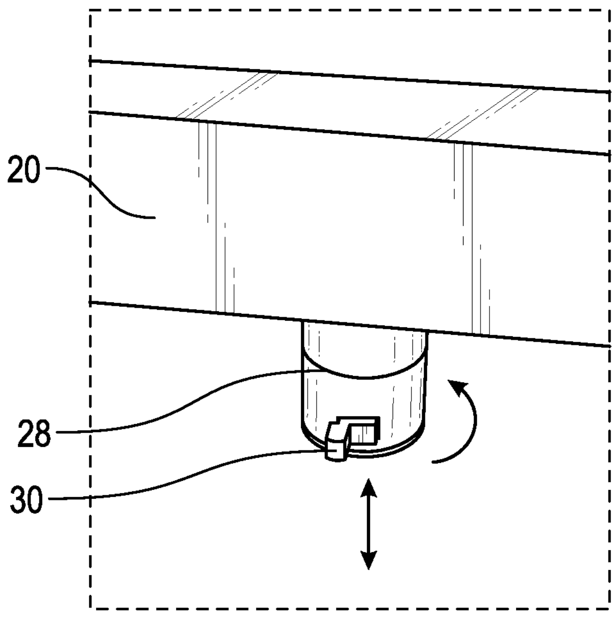
FIG. 7 illustrates the first boring tool insert positioned in the tool holder, in accordance with one embodiment of the present invention.

FIG. 6 shows first boring tool insert 30 aligned with tool receiving area 29 of tool holder 28. Here, first boring tool insert 30 inserts through tool receiving area 29 and first insert clamp 38 connects to the insert connector of tool holder 28. First boring tool insert 30 is tightened to properly secure first boring tool insert 30 to tool holder 28. FIG. 7 shows the feature of first boring tool insert 30 positioned inside tool holder 28.

In the present embodiment, tool holder 28 is configured to rotate in anti-clock direction. This results in first boring tool insert 30 to rotate in the anti-clock direction such that first cutting edge 42 removes/chips away a portion of material from cylinder bore 19 in a rough boring cycle. When first boring tool insert 30 makes the subsequent pass, the chipped away material gets evacuated via first chip groove 46. This helps to avoid the chipped away material to come in contact with the surface of cylinder bore 19 to be machined/or already machined surface. As a result, the formation of torn and folded material (TFM) is eliminated.

Figure 5A:
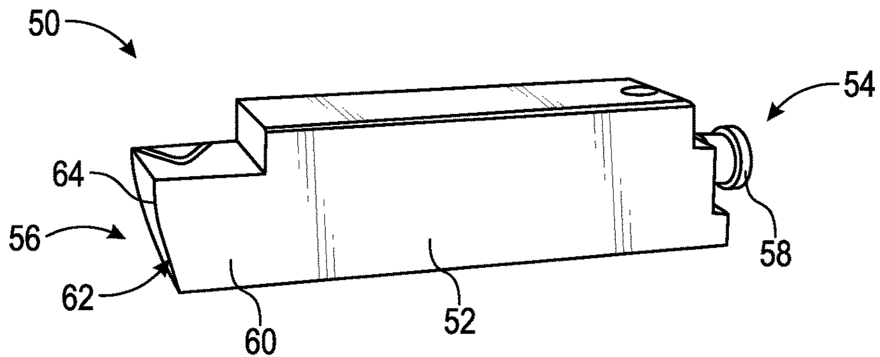
FIG. 5A and FIG. 5B illustrate a top perspective view and a side perspective view, respectively of a second boring tool insert i.e., a traditional boring tool, in accordance with one embodiment of the present invention.
Figure 5B:
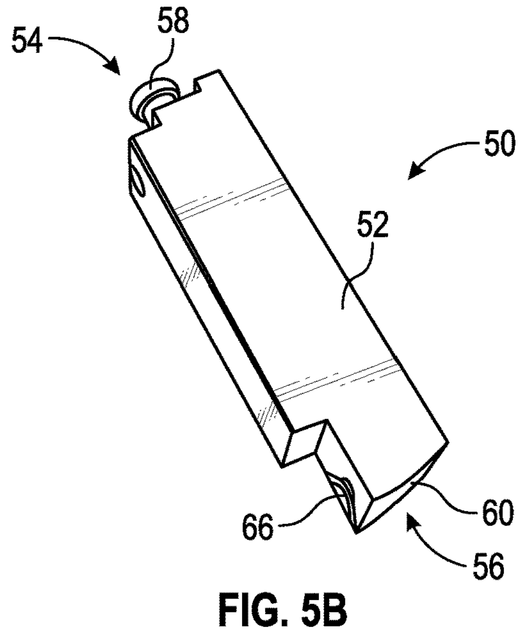

FIG. 5A and FIG. 5B show a top perspective view and a side perspective view, respectively of a second boring tool insert 50, in accordance with one embodiment of the present invention. As specified above, second boring tool insert 50 indicates a traditional boring tool that is configured to operate in a clockwise direction to remove material from cylinder bore 19. Second boring tool insert 50 includes a second body or second insert body 52. Second body 52 is made of hard and durable material such as carbide or any other suitable material. Second body 52 comes in a substantially rectangular configuration. Second body 52 provides structural support and stability during the machining process. Second body 52 has a third end 54 and a fourth end 56. At third end 54, second body 52 has a second insert clamp or second clamp head 58. Second insert clamp 58 extends from second body 52 and interacts with the insert connector (not shown) in tool holder 28, when inserted through tool receiving area 29. Second insert clamp 58 is configured to hold second boring tool insert 50 in place and maintain its position within tool holder 28 during machining. Second body 52 further includes a second extended section 60. Second extended section 60 extends from second body 52. Second extended section 60 has a second cutting edge 62. Second cutting edge 62 indicates a sharp and an active portion of second boring tool insert 50 that comes in contact with cylinder bore 19 during machining. In one embodiment, second cutting edge 62 is precisely machined to achieve a specific cutting geometry in cylinder bore 19. Further, second cutting edge 62 has a second radius or second nose radius 64. Second radius 64 has a round or curved configuration at the intersection of second cutting edge 62. Second radius 64 is configured to position in a clockwise direction for operating tool holder 28 in the clockwise direction to machine cylinder bore 19. Second radius 64 has a suitable smooth curve (i.e., suitable size of nose radius) in order to reduce stress concentrations on cylinder bore 19 and also to improve the durability of second boring tool insert 50. Second radius 64 facilitates in achieving the precise machining performance and the surface finish (fine boring finish) in cylinder bore 19 to be machined. In addition, second extended section 60 has a second chip groove or second flute 66 at the bottom. Second chip groove 66 helps to guide and control the flow of chips/torn and folded materials (TFM) away from a cutting zone during machining. In other words, second chip groove 66 helps to evacuate any remaining chips or metallic debris removed during machining so that they do not come in contact with the surface to be machined or machined surface.

Figure 8:
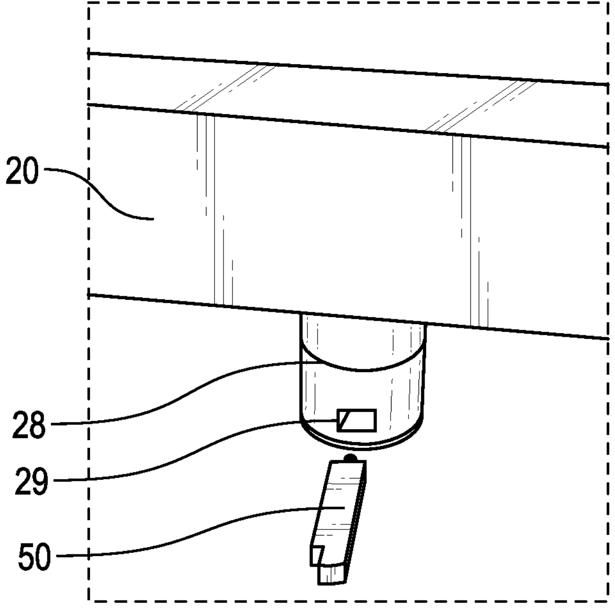
FIG. 8 illustrates the traditional boring tool insert aligned with the tool holder, in accordance with one embodiment of the present invention.
Figure 9:
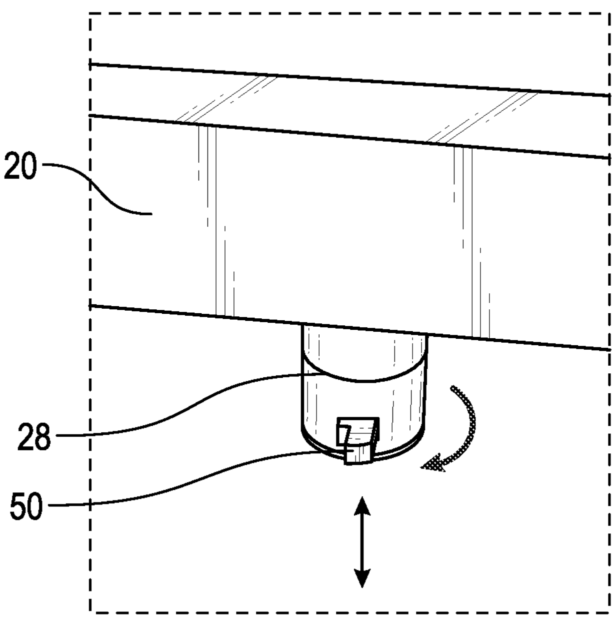
FIG. 9 illustrates the traditional boring tool insert positioned in the tool holder and rotating in a clockwise direction, in accordance with one embodiment of the present invention.

FIG. 8 shows second boring tool insert 50 aligned with tool receiving area 29 of tool holder 28. Here, second boring tool insert 50 inserts through tool receiving area 29 and second insert clamp 58 connects to the insert connector of tool holder 28. Second boring tool insert 50 is tightened to properly secure second boring tool insert 50 to tool holder 28. FIG. 9 shows the feature of second boring tool insert 50 positioned inside tool holder 28.

In the present embodiment, tool holder 28 is configured to rotate in clock direction. This results in second boring tool insert 50 to rotate in the clock direction such that second cutting edge 62 removes/chips away a portion of material from cylinder bore 19 in a fine boring cycle. When second boring tool insert 50 makes the subsequent pass, the chipped away material gets evacuated via second chip groove 66. This helps to avoid the chipped away material to come in contact with the surface of cylinder bore 19 to be machined. As a result, the formation of torn and folded material (TFM) is eliminated.

Although the above embodiment presents first boring tool insert 30 to rotate in anticlockwise direction (first direction), and second boring tool insert 50 to rotate in clockwise direction (i.e., opposite direction of first boring tool insert 30), it is obvious to a skilled in the art to configure first boring tool insert 30 to rotate in clockwise direction (first direction), and second boring tool insert 50 to rotate in anticlockwise direction (i.e., opposite direction of first boring tool insert 30) without departing from the scope of the present invention.

In one implementation, display 22 acts as an operational panel for operating cylinder boring machine 10 in order to machine cylinder bore 19 with tool inserts 30, 50. In one example, cylinder boring machine 10 includes a controller (not shown). The controller is configured for operating cylinder boring machine 10. Cylinder boring machine 10 includes an interface such as a manual and computerized or touchscreen interface. In one example, display 22 presents the interface for an operator to determine the parameters for operating cylinder boring machine 10. A person skilled in the art understands that the interface allows the operator to navigate the options provided on display 22 or set the programmable settings to store and operate cylinder boring machine 10 based on specific machining profiles. Further, cylinder boring machine 10 includes a spindle motor (not shown) operatively connected to tool holder 28.

Figure 10:
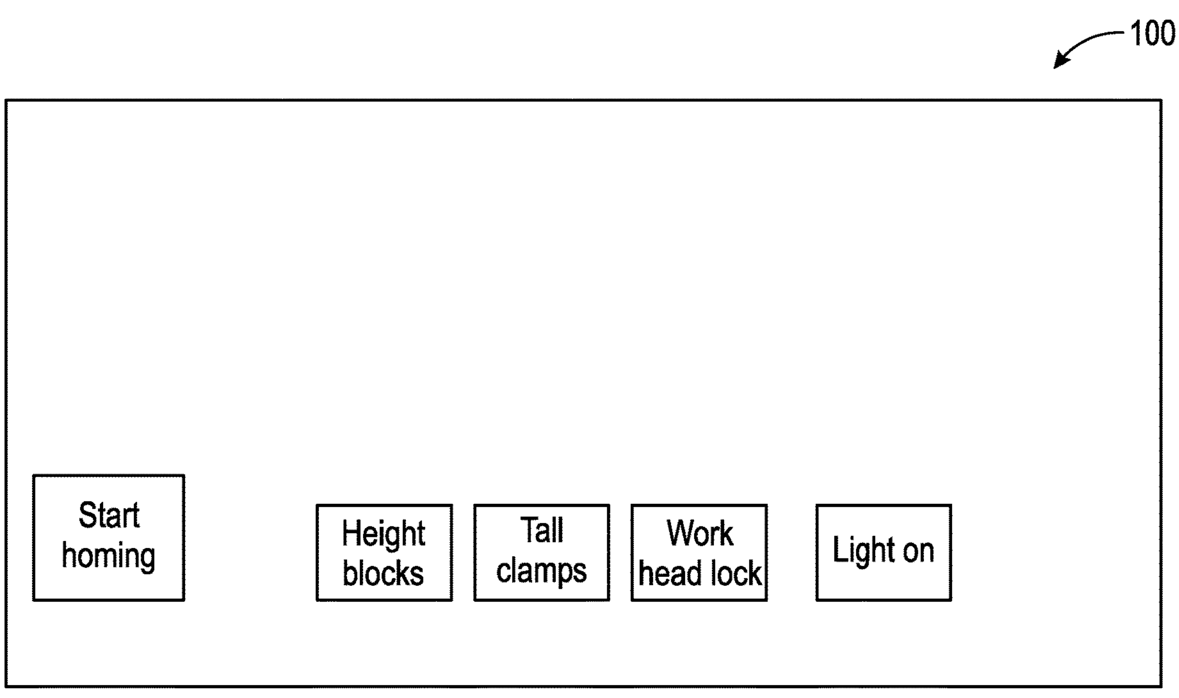
FIG. 10, FIG. 11, FIG. 12, FIG. 13, FIG. 14, FIG. 15, FIG. 16 and FIG. 17 illustrate interfaces displayed on a display for controlling the operation of the cylinder boring machine, in accordance with one embodiment of the present invention.
Figure 11:
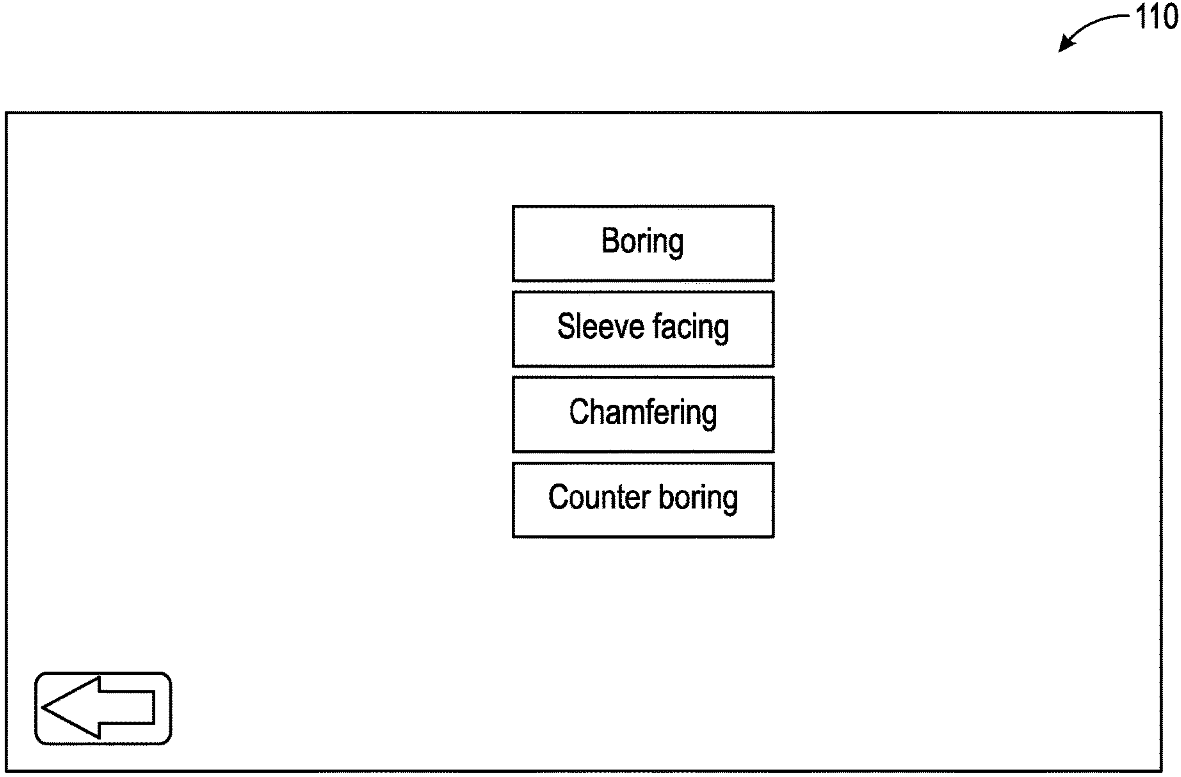
Figure 12:
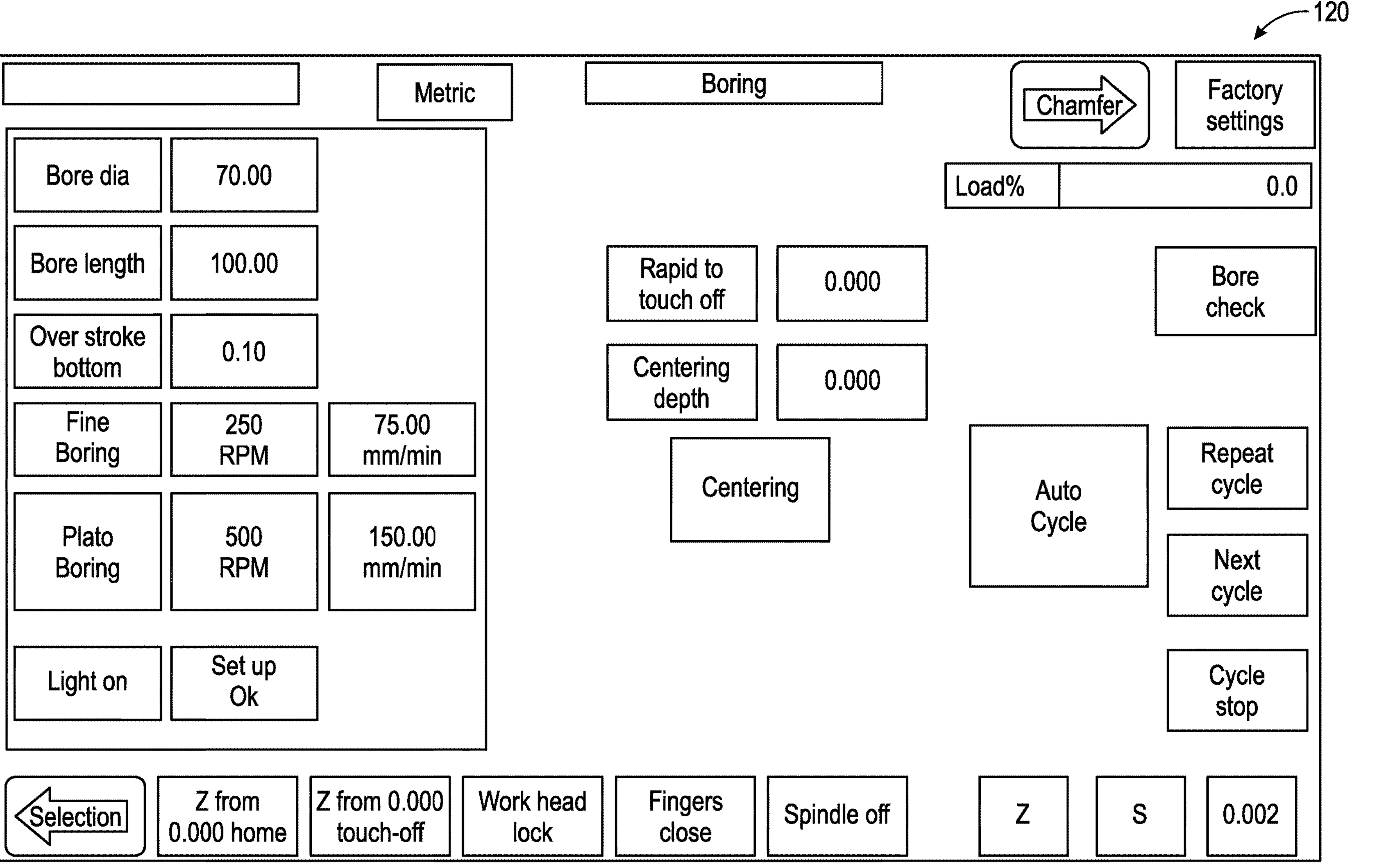

Now referring to FIG. 10, a home screen 100 displayed on display 22 is shown, in accordance with one exemplary embodiment of the present invention. As specified above, display 22 presents a touch interface to select options for honing, locking of workhead, etc. Upon selecting the honing option, display 22 presents options to select machining processes. FIG. 11 shows a first interface 110 upon selecting the honing option, in accordance with one exemplary embodiment of the present invention. As can be seen, first interface 110 presents options such as boring, sleeve facing, chamfering and counter boring. FIG. 12 shows a second interface 120 displayed on display 22 upon selecting the boring option in first interface 110, in accordance with one exemplary embodiment of the present invention. The options presented in second interface 120 are used to perform boring operation in cylinder bore 19. The boring operation includes enlarging and refining the inner diameter of cylinder bore 19 to desired size, roundness, surface finish, etc. For example, second interface 120 presents options to select the parameters such as bore diameter, bore roundness, centering depth, cutting speed in rotations per minute (RPM) for first boring tool insert 30 and second boring tool insert 50, etc. Further, second interface 120 presents options to select automatic cycle and termination of the operation cycle with a single touch of a button/option presented on display 22.

Figure 13:
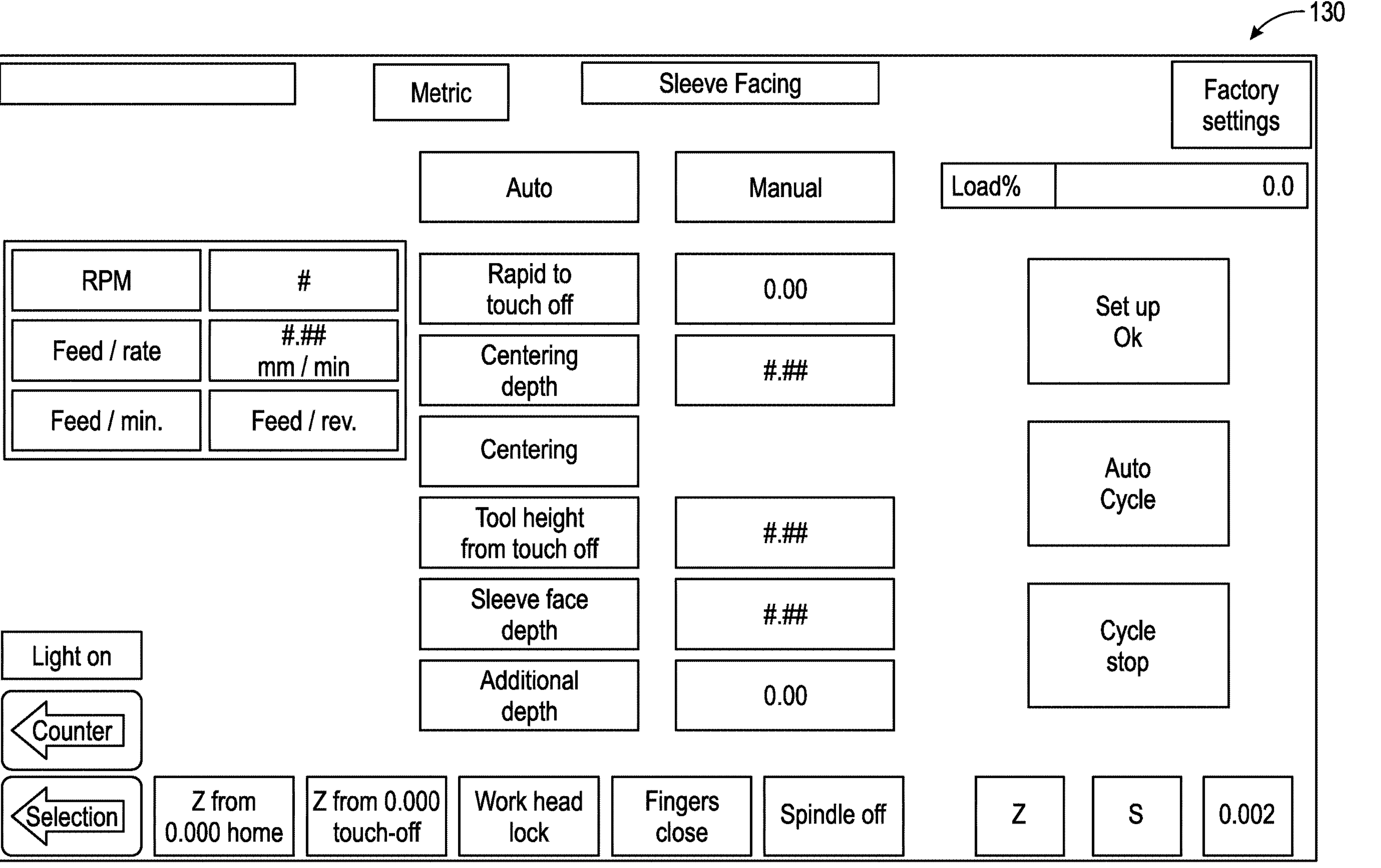

FIG. 13 shows a third interface 130 displayed on display 22 upon selecting the sleeve facing option in first interface 110, in accordance with one exemplary embodiment of the present invention. The options presented in third interface 130 are used to perform sleeve facing operation in cylinder bore 19. The sleeve facing operation includes machining or finishing surface of cylinder bore 19. For example, third interface 130 presents options to select the parameters such as facing depth i.e., axial depth to which cylinder bore 19 is to be machined, surface finish, facing feed rate, etc. etc. Further, third interface 130 presents options to select automatic cycle and termination of the operation cycle with a single touch of a button/option presented on display 22.

Figure 14:
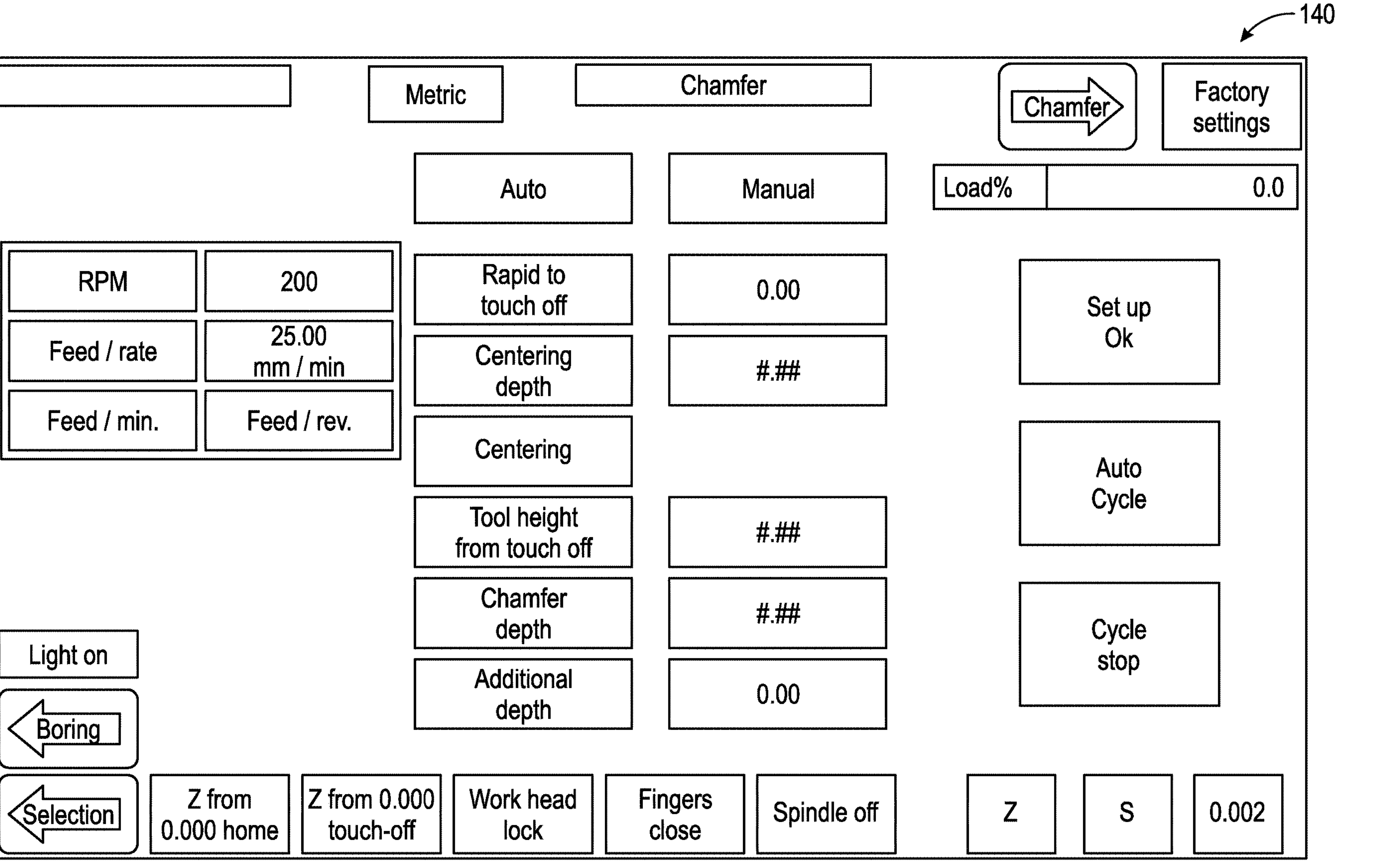

FIG. 14 shows a fourth interface 140 displayed on display 22 upon selecting the chamfer option in first interface 110, in accordance with one exemplary embodiment of the present invention. The options presented in fourth interface 140 are used to perform chamfer operation in cylinder bore 19. Chamfer process helps to add a beveled edge to the entrance or exit of the machined surface i.e., cylinder bore 19. Here, chamfering is applied to edges of cylinder bore 19. For example, fourth interface 140 presents options to select the parameters such as chamfer width and length, chamfer angle, surface finish, feed rate, etc. Further, fourth interface 140 presents options to select automatic cycle and termination of the operation cycle with a single touch of a button/option presented on display 22.

Figure 15:
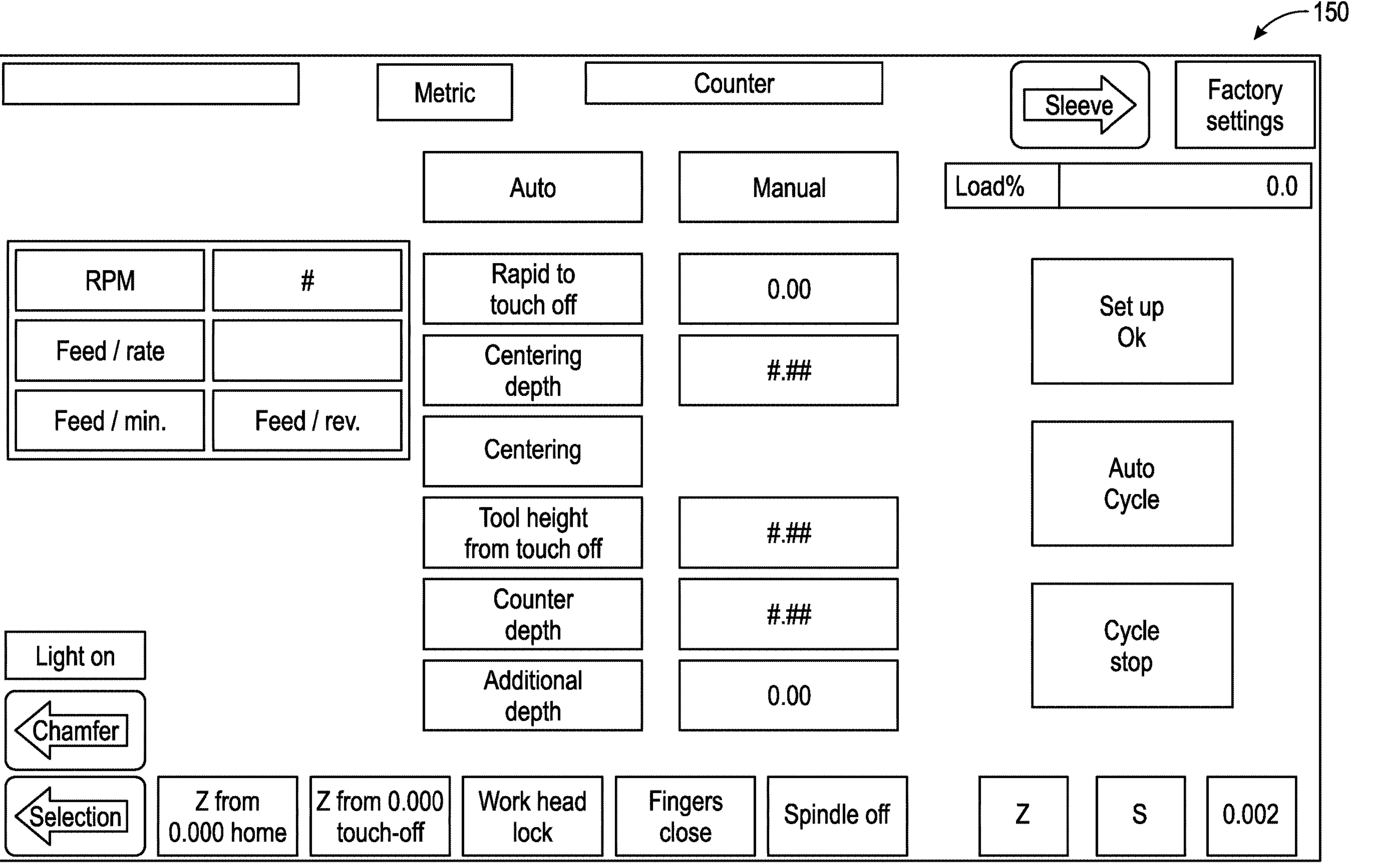

FIG. 15 shows a fifth interface 150 displayed on display 22 upon selecting the counter option in first interface 110, in accordance with one exemplary embodiment of the present invention. The options presented in fifth interface 150 are used to perform countering operation in cylinder bore 19. Counter process includes creating a counterbore at the top of cylinder bore 19 to accommodate components such as valve seats, for example. For example, fifth interface 150 presents options to select the parameters such as counterbore diameter, counterbore depth, counterbore angle, feed rate, etc. Further, fifth interface 150 presents options to select automatic cycle and termination of the operation cycle with a single touch of a button/option presented on display 22.

Figure 16:
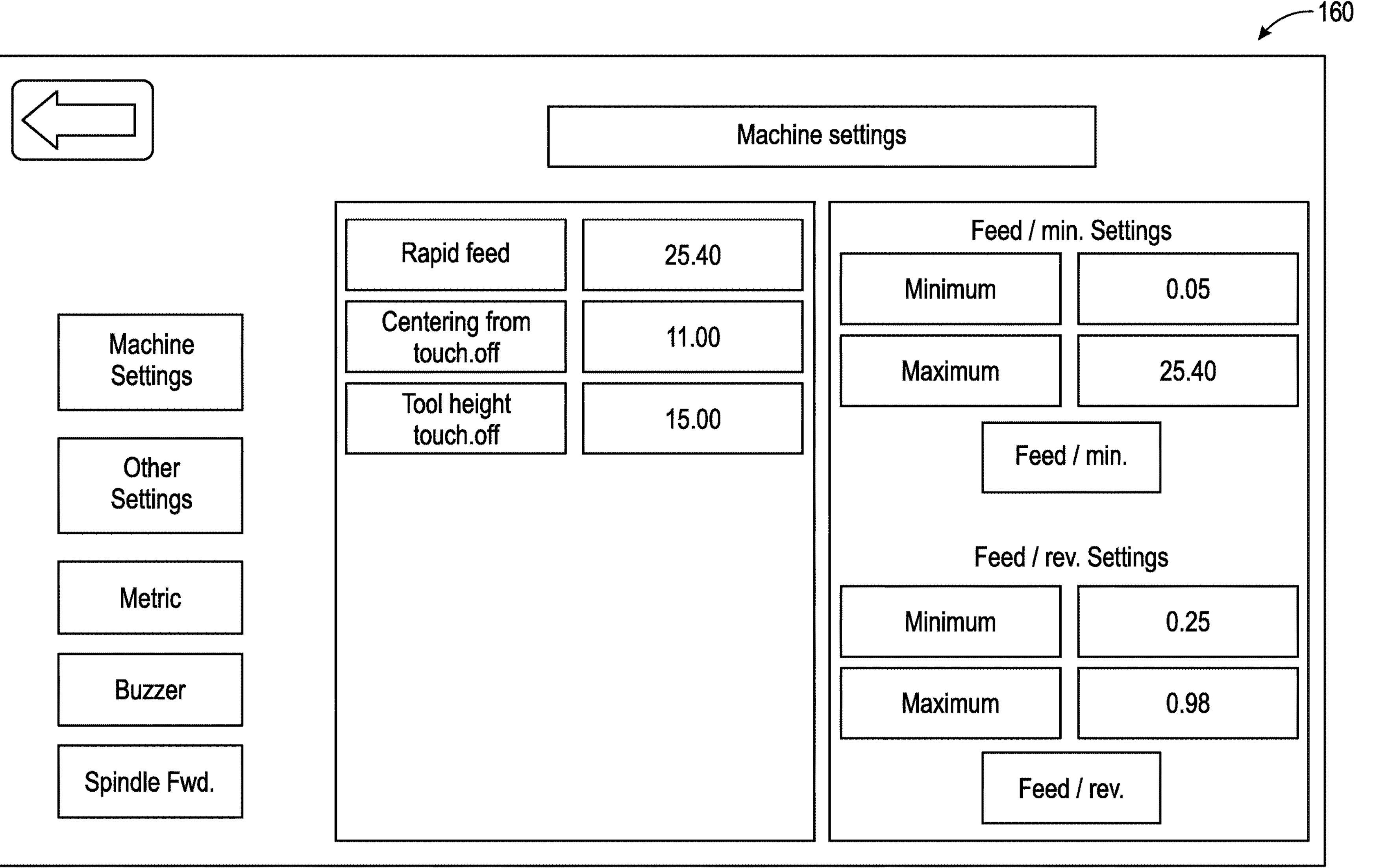
Figure 17:
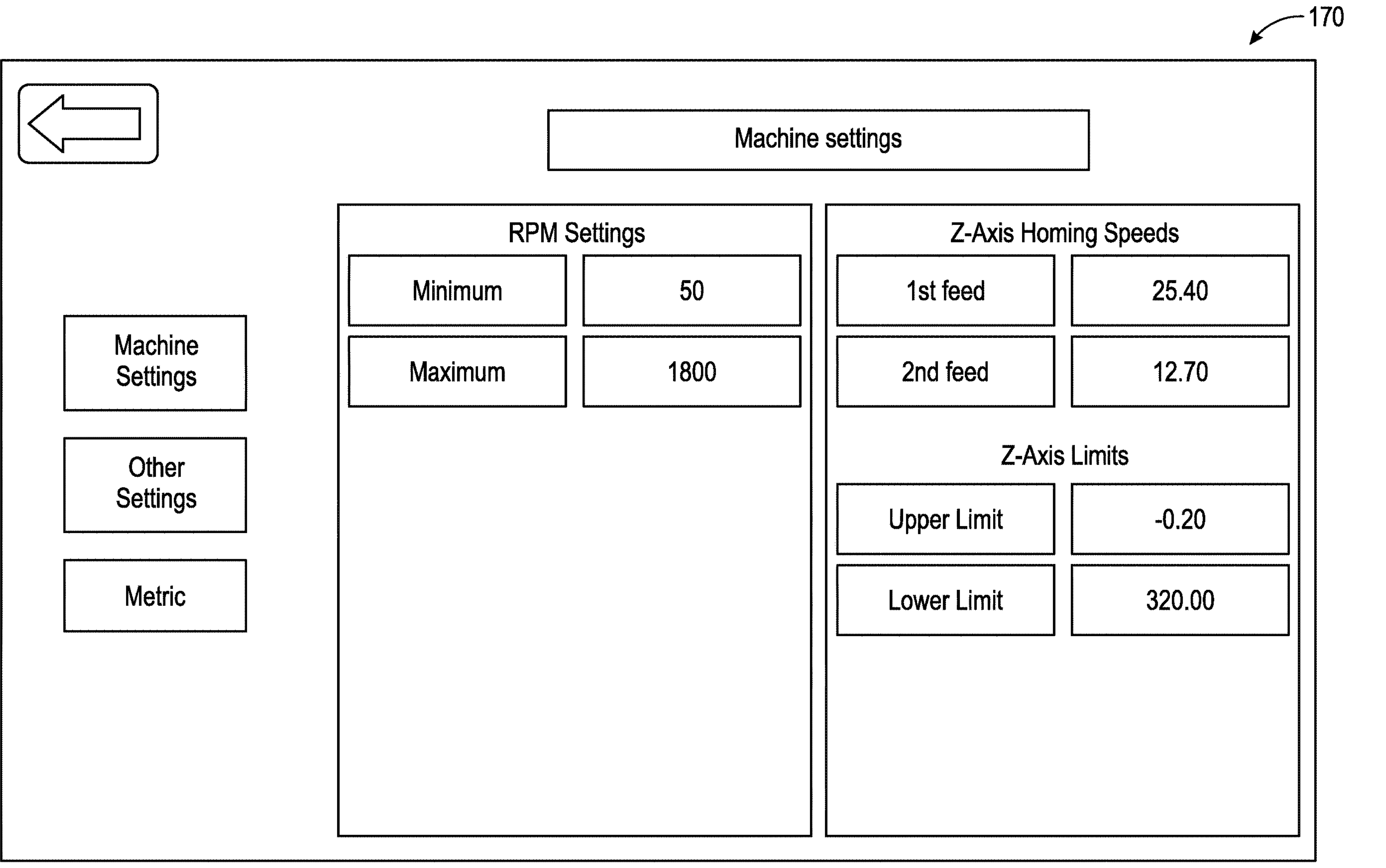

FIG. 16 and FIG. 17 show a sixth interface 160 and a seventh interface 170, respectively displayed on display 22, in accordance with one exemplary embodiment of the present invention. Sixth interface 160 and seventh interface 170 present machine settings. The operator may change the machine settings based on the machining operation such as centering, feed rate, tool height touch off, tool speed, etc.

Now, the operation of cylinder boring machine 10 for machining cylinder bore 19 is explained. Consider cylinder bore 19 needs to be machined about 100 microns' depth. At first, the operator connects cylinder block 18 to cylinder block fixtures 16 such that cylinder bore 19 to be machined faces tool holder 28. Subsequently, the operator inserts first boring tool insert 30 in tool holder 28 via tool receiving area 29. Subsequently, the operator determines the parameters for boring operation. As specified above, the operator determines bore diameter, bore roundness, centering depth, cutting speed in rotations per minute (RPM) for first boring tool insert 30, etc. After setting the parameters, the operator initiates a boring cycle i.e., tool holder 28 to perform boring operation in cylinder bore 19 by selecting the automatic cycle option in second interface 120. Subsequently, tool holder 28 starts rotating in anti-clock direction while advancing axially into cylinder bore 19. As tool holder 28 rotates in the anti-clock direction, the boring operation is termed as "reverse boring cycle" or "reverse platoboring".

At first, tool holder 28 centers itself with respect to cylinder bore 19. After centering, tool holder 28 advances axially such that first cutting edge 42 of first boring tool insert 30 comes in contact with the surface of cylinder bore 19. First cutting edge 42 removes a portion of material from cylinder bore 19 with each pass/rotation as it comes in contact with the surface of cylinder bore 19. In one example, first cutting edge 42 helps to remove 75 microns of the required 100 microns' depth with rough finishing (rough boring cycle). The material that is removed or debris formed gets collected at first chip groove 46. This ensures there is no material debris left at the surface of cylinder bore 19 to be machined. In one example, first cutting edge 42 is configured to remove say up to 75 microns' depth. Cylinder boring machine 10 operates tool holder 28 until 75 microns' depth of machining is achieved.

In one example, the controller operatively connects to a rotary encoder (not shown). The rotary encoder is configured to provide feedback to the controller of accurate position for rotating components such as tool holder 28 and first boring tool insert 30. The position information such as rotational speed of tool holder 28 and first boring tool insert 30 helps the controller to precisely determine the location of first boring tool insert 30 with respect to cylinder bore 19 and control and adjust the machining speed/depth during the machining process. Further, the rotary encoder provides continuous feedback to the controller to adjust and/or optimize the machining process in real-time in order to enhance the precision and consistency during the machining. In addition, the rotary encoder captures the precision achieved in a machining process and allows the controller to repeat the machining process to achieve overall accuracy and repeatability of the cylinder bore machining.

After cutting the material (say about 75 microns) from cylinder bore 19 with first boring tool insert 30, tool holder 28 is retracted axially and first boring tool insert 30 is removed from tool holder 28. Subsequently, second boring tool insert 50 is connected to tool holder 28 via tool receiving area 29. Further, the operator determines the parameters such as surface finish required, cutting speed in rotations per minute (RPM) for second boring tool insert 50, etc. After setting the parameters, the operator initiates a fine boring cycle i.e., tool holder 28 to perform boring operation in cylinder bore 19 by selecting the automatic cycle option in second interface 120. Subsequently, tool holder 28 starts rotating in clockwise direction while advancing axially into cylinder bore 19. Here, tool holder 28 centers itself with respect to cylinder bore 19. After centering, tool holder 28 advances axially such that second cutting edge 62 of second boring tool insert 50 comes in contact with the surface of cylinder bore 19. Second cutting edge 62 smoothens the surface by removing finer material of up to 25 microns from cylinder bore 19 to achieve the required surface finish. The material that is removed or debris formed gets collected at second chip groove 66. This ensures there is no material debris left at the surface of cylinder bore 19 and eliminates torn and folded material (TFM) left in cylinder bore 19.

When compared with prior art which requires use of honing insert or tool for achieving the surface finish required, the presently disclosed boring tool inserts help to achieve the required surface finish in the cylinder bore with boring inserts (rough and fine boring cycles) itself. In the prior art, one has to perform honing operation on the cylinder bore surface to achieve the standard values of surface parameters such as average roughness, $R_a$; bearing ratio parameters, (reduced peak height) $R_{pk}$, (reduced valley depth) $R_{vk}$, and (core roughness depth) $R_k$; mean peak spacing or mean spacing of profile elements, $S_m$; skewness, $R_{sk}$; and the average maximum profile height, $R_z$. In other words, it is not possible in the prior art to achieve the standard values of surface parameters using boring operation alone. They require honing operation in addition to the boring operation to achieve the standard values of surface parameters.

In the presently disclosed invention, the boring tool inserts (plato boring/rough boring and fine boring inserts) help to achieve the finer surface finish while also eliminating any torn and folded material (TFM) left in the cylinder bore after finishing rough and fine boring cycles. In other words, the presently disclosed tool inserts take care of TFM in the reverse cycle of the boring itself. In one example, the presently disclosed boring tool inserts help to achieve very close bore finish after boring, honing, cross hatch and plateau honing with surface parameters (reduced peak height) $R_{pk}$ of 10 to 15 microns, (reduced valley depth) $R_{vk}$ of 40 to 50 microns, and (core roughness depth) $R_k$ of 50 to 55 microns. After performing the rough and fine boring cycles, light honing strokes followed by cross hatch and plateau honing will provide needed results, the above specified surface parameters can be achieved.

A person skilled in the art appreciates that the boring tool insert for machining a cylinder bore can come in a variety of shapes and sizes depending on the need. Further, many changes in the design and placement of components may take place without deviating from the scope of the presently disclosed tool insert.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A cylinder boring machine, comprising:

a housing having cylinder block fixtures for receiving a cylinder block, wherein said cylinder block comprises a cylinder bore;

a working head positioned above said housing, wherein said working head comprises a tool holder;

a first boring tool insert and a second boring tool insert insertable in said tool holder, wherein said first boring tool insert comprises a first body having a first insert clamp at one end and a first cutting edge at the other end, wherein said first cutting edge comprises a first radius at an intersection of said first cutting edge, and wherein said second boring tool insert comprises a second body having a second insert clamp at one end and a second cutting edge at the other end, wherein said second cutting edge comprises a second radius at an intersection of said second cutting edge;

an operational panel; and a controller communicatively connected to said operational panel, wherein said controller controls said tool holder, wherein said controller is configured to operate said tool holder connecting said first boring tool insert in a rough boring cycle to axially move and rotate in an anticlockwise direction such that said first cutting edge comes in contact with the surface of said cylinder bore to remove the material from the surface of said cylinder bore, wherein said first boring tool insert is removable from said tool holder after the rough boring cycle, and wherein said second boring tool insert is insertable in said tool holder after removal of said first boring tool insert, wherein said controller is configured to operate said tool holder connecting said second boring tool insert in a fine boring cycle to axially move and rotate in a clockwise direction opposite to the anticlockwise direction of the first boring tool insert such that said second cutting edge comes in contact with the surface of said cylinder bore to smoothen the surface of said cylinder bore, and wherein said second boring tool insert is configured to eliminate torn and folded materials (TFM) left in said cylinder bore after the rough boring cycle by said first boring tool insert, and wherein the rough boring cycle and the fine boring cycle cooperate to establish bore geometry of said cylinder bore to a desired size and roughness and to achieve the required surface finish in said cylinder bore with the boring process itself.

2. The cylinder boring machine of claim 1, wherein said first insert clamp connects to an insert connector in said tool holder.

3. The cylinder boring machine of claim 1, wherein said tool holder comprises a tool receiving area for receiving said first boring tool insert.

4. The cylinder boring machine of claim 1, wherein said first cutting edge comprises a first chip groove, and wherein said first chip groove evacuates the material removed during machining.

5. The cylinder boring machine of claim 1, wherein said second insert clamp connects to an insert connector in said tool holder.

6. The cylinder boring machine of claim 1, wherein said tool holder comprises a tool receiving area for receiving said second boring tool insert.

7. The cylinder boring machine of claim 1, wherein said second cutting edge comprises a second chip groove, and wherein said second first-chip groove evacuates the material removed during machining.

8. A method of machining a cylinder bore by a cylinder boring machine, said method comprising the steps of:

providing a housing having cylinder block fixtures for receiving a cylinder block, said cylinder block comprising a cylinder bore;

providing a working head positioned above said housing, said working head comprising a tool holder;

providing a first boring tool insert and a second boring tool insert, wherein said first boring tool insert comprises a first body having a first insert clamp at one end and a first cutting edge at the other end, wherein said first cutting edge comprises a first radius at an intersection of said first cutting edge, and wherein said second boring tool insert comprises a second body having a second insert clamp at one end and a second cutting edge at the other end, wherein said second cutting edge comprises a second radius at an intersection of said second cutting edge;

providing an operational panel and a controller communicatively connected to said operational panel, said controller controlling said tool holder;

operating, by said controller, said tool holder connecting said first boring tool insert in a rough boring cycle to axially move and rotate in an anticlockwise direction such that said first cutting edge of said first boring tool insert comes in contact with the surface of said cylinder bore to remove the material from the surface of said cylinder bore;

removing said first boring tool insert from said tool holder, and inserting said second boring tool insert; and operating, by said controller, said second boring tool insert in a fine boring cycle to axially move and rotate in a clockwise direction opposite of said first boring tool insert such that said second cutting edge of said second boring tool insert comes in contact with the surface of said cylinder bore to smoothen the surface of said cylinder bore and eliminates torn and folded materials (TFM) left in said cylinder bore after the rough boring cycle by said first boring tool insert, wherein the rough boring cycle and the fine boring cycle cooperate to establish bore geometry of said cylinder bore to a desired size and roundness and to achieve the required surface finish in said cylinder bore with the boring process itself.

9. The method of claim 8, further comprising providing a tool receiving area in said tool holder for receiving said first boring tool insert and said second boring tool insert.

* * * * *